Sept. 15, 1959 G. M. BOOTH 2,904,401
VISCOSITY CONTROL METHOD AND APPARATUS FOR HYDRATING LIME
Filed Nov. 1, 1955 4 Sheets-Sheet 1
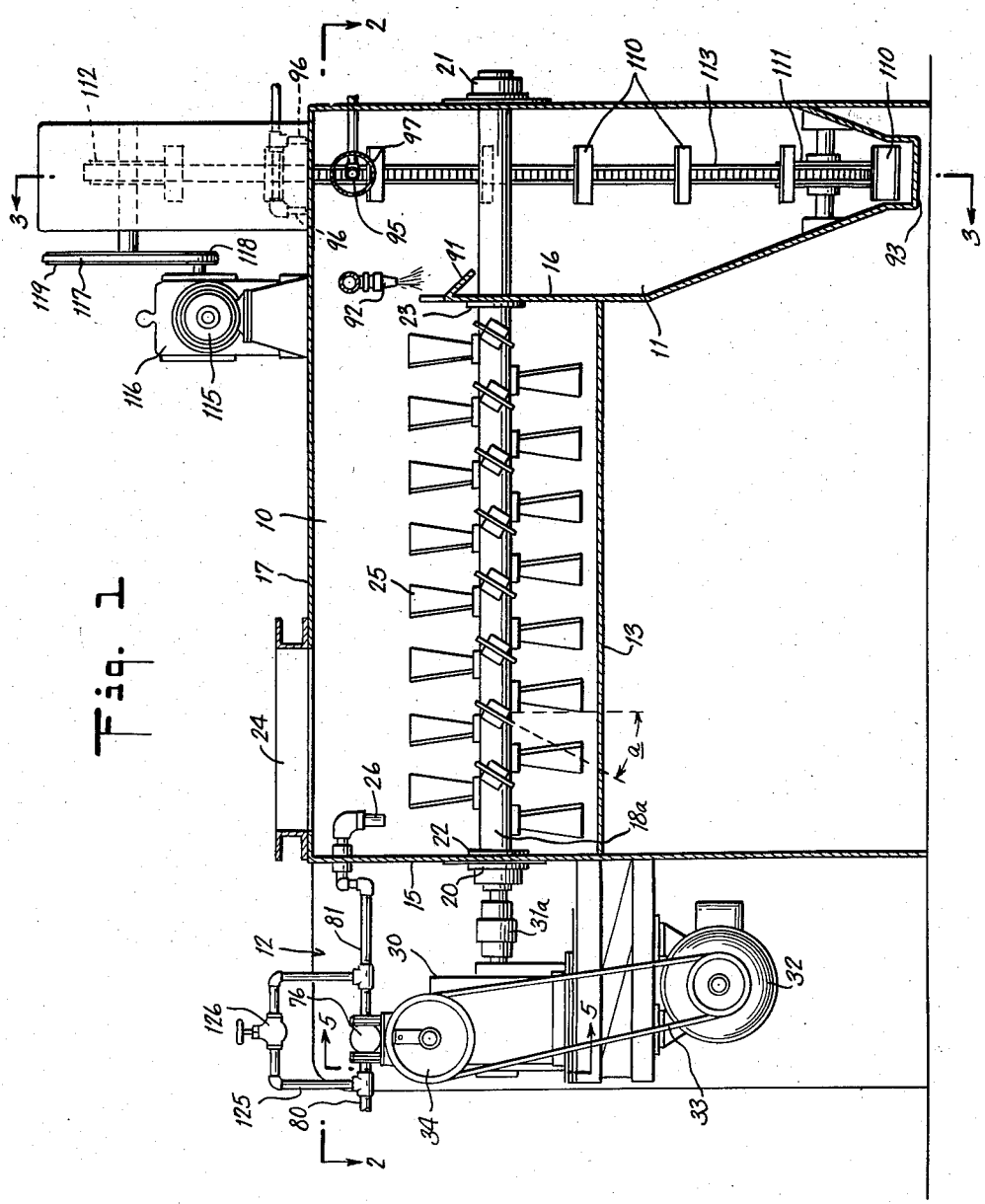
INVENTOR.
GEORGE M. BOOTH
BY
Robert S. Dunham
ATTORNEY

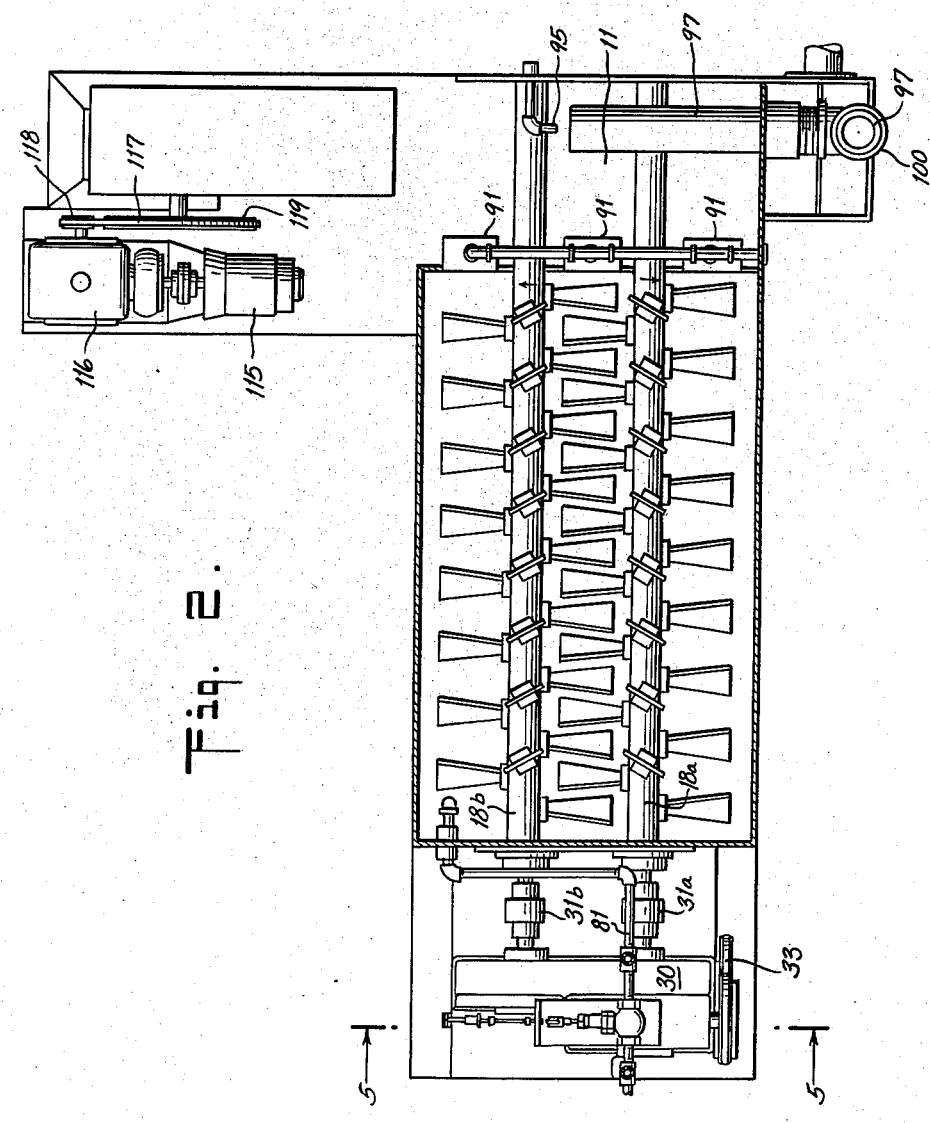

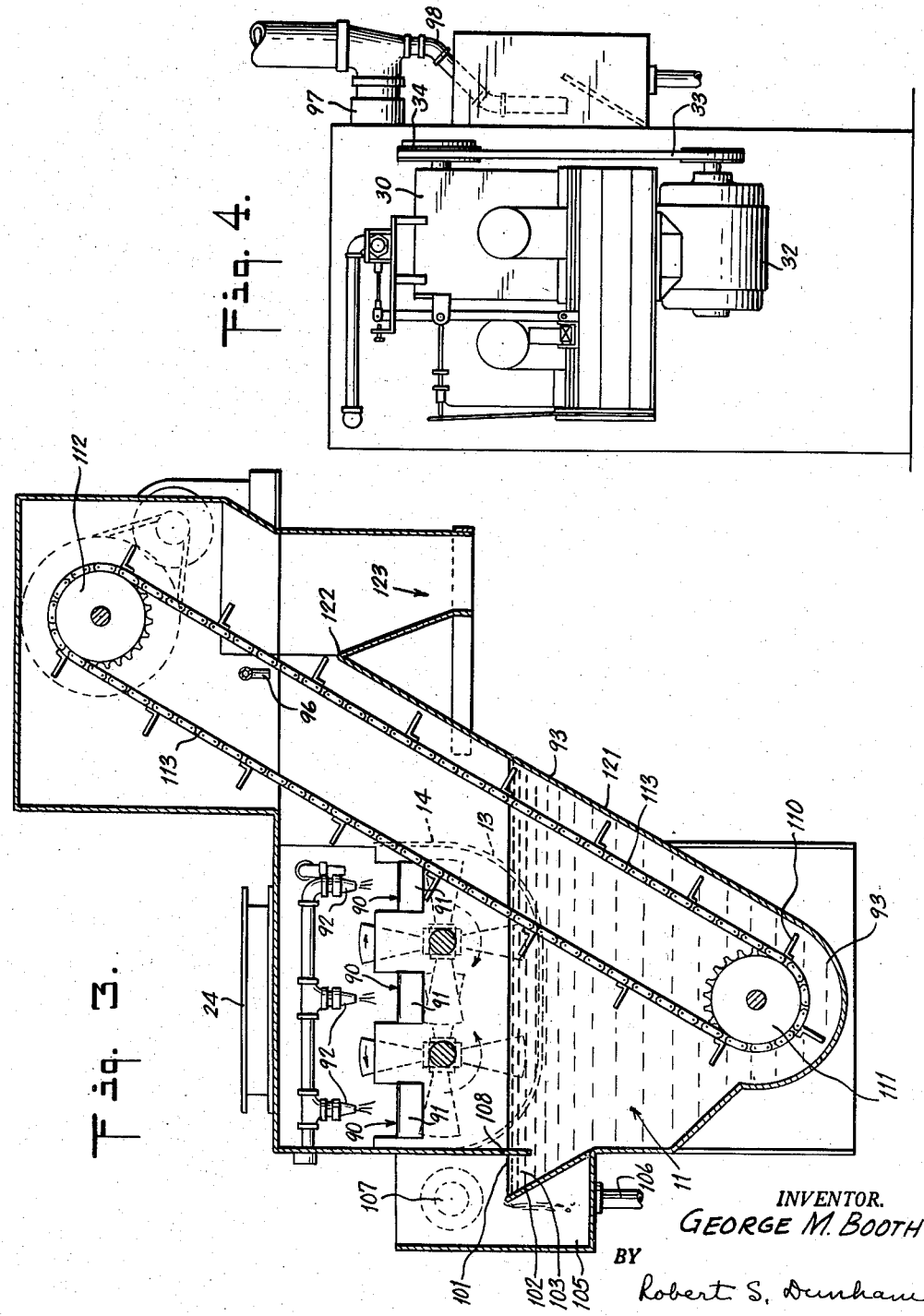

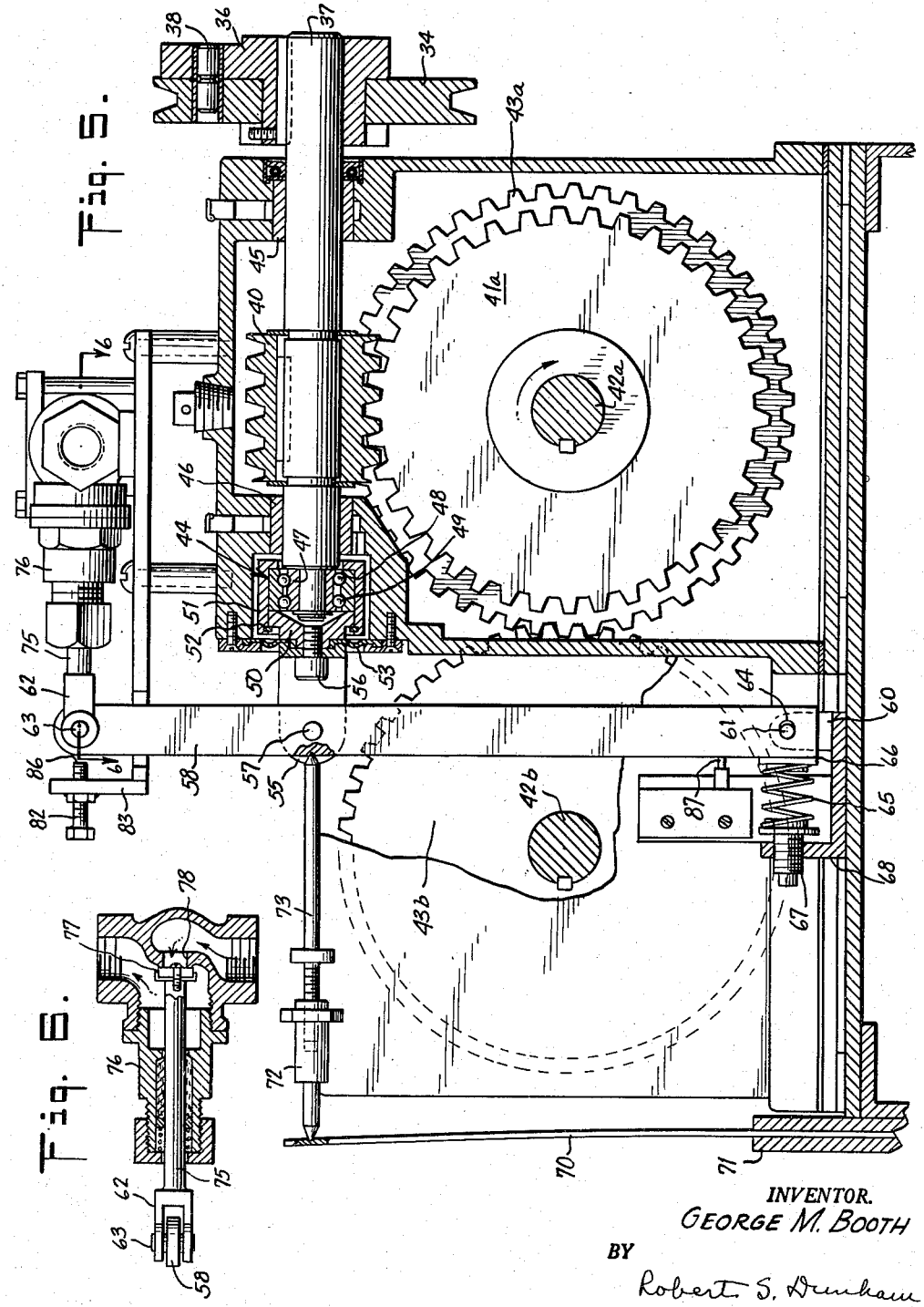

United States Patent Office 2,904,401
Patented Sept. 15, 1959

2,904,401

VISCOSITY CONTROL METHOD AND APPARATUS FOR HYDRATING LIME

George M. Booth, Westfield, N.J., assignor to Wallace & Tiernan Incorporated, Belleville, N.J., a corporation of Delaware Application November 1, 1955, Serial No. 544,143

5 Claims. (Cl. 23—188)

This invention relates to the preparation of products by mixing operations, and is primarily directed to novel apparatus and procedure for producing slaked lime continuously by mixture of quicklime with water, in a way that affords easily controlled, highly uniform and effective hydration of the lime.

Slaked or hydrated lime, produced in a continuous manner from commercial lime and delivered in aqueous mixture, has a variety of uses, especially in technical or industrial processes of which some examples are in the treatment of water. Thus slaked lime is used for correcting the pH or acidity of water, for assistance in coagulating suspended matter in water or other aqueous liquids, and as one of the treating agents in the so-called lime-soda process for softening water. For such purposes, economical practice is to slake the lime, i.e. calcium oxide (CaO), by admixture of water, at the locality of use, yielding a water suspension of hydrated lime, viz. calcium hydroxide $Ca(OH)_2$; in large water-treating plants and indeed for most of the purposes here contemplated, more or less continuous delivery of such product is required, at least over considerable intervals.

As used for lime slaking operations of the sort described above, commercial quicklime ordinarily has a calcium oxide content of 80% or better but is nevertheless a relatively crude or impure product. Its physical condition is particularly unsuitable, in that it is usually an aggregate of various sizes ranging from powder and granules up to hard lumps as large as ¾ inch or so in diameter. The grade or quality of lime (meaning quicklime) may vary quite widely, even in successive lots from the same producer, largely because of differences in the limestone or other calcareous material which has been calcined to make the lime. Such variation may extend to the size and hardness of the lumps and to the amount and nature of impurities. The impurities in lime are usually derived from the original limestone and may include some magnesium oxide and considerable material such as stones, coal, grit, sand and the like.

The principal difficulty in slaking is believed to reside in getting effective contact between the water and all the actual lime particles. The larger the lumps, the more time appears to be needed for penetration of water; the initial wetting of a lump surface seems to result in an encapsulating layer of paste or moist slaked lime which, unless removed, slows the process greatly. This layer can be removed and the slaking accelerated by both heat and physical action, for example in that if the temperature reaches approximately 212° F., steam formation in the surface or outer parts of the lump will accelerate disintegration, while agitation of the mass tends to remove the layer by abrasion. Foreign matter may also impede the slaking action in some respects, and in any event imposes the further problem of separation of such matter, particularly grit and stones, from the ultimate aqueous suspension.

Although a variety of devices and methods have been proposed, conventional slakers now generally use about 4 pounds or more of water to one pound of quicklime, as feed, and provide agitation of the mixture with the view of achieving some abrasion of the lumps. Conditions in the conventional apparatus are such as to provide complete slaking in about thirty minutes, i.e. the specified retention time in most slakers now available. Although the chemical reaction of slaking is exothermic, it has usually been deemed necessary to provide a heated water supply, and even then the operating temperature is no more than about 150° to 170° F. With the dilution specified (about 4 parts of water to each part of lime, by weight), insufficient heat is evolved to attain higher temperatures; indeed the best obtainable temperature appears to be limited to the above range, i.e. around 160° F., and below 190°. The efficiency of the physical agitation, i.e. in effecting abrasion or mechanical break-up of the lime lumps, has also been relatively poor in these operations.

The usual slaking apparatus has been large and cumbersome, especially because of the long retention time needed, and it has also been customary to provide insulation, for better maintenance of the stated temperatures. Operation, despite such precautions, is often unpredictable, in that the results tend to vary according to the grade of the lime and the external temperature. With some kinds, e.g. poorer grades, of lime it may be impossible to achieve complete slaking, even though the temperature reaches the maximum attainable in the apparatus.

Important objects of the present invention are to afford improvements, particularly for continuous operation, such that effective slaking is achieved with lime of varying qualities and physical characteristics, and such that in all cases more efficient results and more effective control are obtained. Particular objects are to achieve slaking in a satisfactory and complete manner with apparatus of relatively small size, and to provide a much more rapid operation, i.e. in the attainment of complete slaking with a relatively short time of passage through the mixing vessel. Further objects are to afford improved methods and procedure for slaking lime, applicable to a wide range of rates of lime feed, yet with uniformity of results in the yield of a fully slaked product.

To these and other ends the present invention involves procedure and apparatus wherein the slaking mixture of lime and water is constituted to provide a thick paste, instead of the more dilute slurry now conventional in slakers, and the paste character of the mixture, as it is continuously formed and continuously delivered, is maintained by sensing the consistency or resistance to agitation, and by adjusting the rate of feed, e.g. the water, as necessary to keep a constant, optimum stiffness if the mass of material being mixed.

By maintaining the mixture in the form of a paste, for example at about 2 pounds of water per pound of lime, a temperature at or near 212° F. is readily maintained during operation; it appears that the heat of the slaking reaction (about 490 B.t.u. per pound of CaO) is then adequate to raise the relatively limited amount of water to that temperature, without any preheating of the water and indeed even when the water is supplied at 32° F. At the same time, when the mixture in the slaking compartment is allowed to become no more fluid than a thick or stiff paste, much greater efficiency is achieved in utilization of the power applied to the agitating means for actual abrasion or breaking up of the lime lumps. The mixing elements exert their force far more directly on the pieces of lime, than in the situation of more dilute mixtures where the tendency is simply to stir the pieces about in the liquid.

In consequence of these factors, which presumably include the disintegrating effect of internal or surface steam formation (at 212° F.) on the lime lumps, complete slaking is readily achieved with poor as well as good grades of lime and is accomplished in an unusually rapid manner, for example with a retention time of as little as 5 minutes for the material traversing the slaking compartment. The volume of the slaking compartment is for these reasons much smaller than required in conventional slakers, and there is a substantial reduction in the power required for agitation.

While in the prior, high-dilution types of slaker the ratio of water to lime did not require any close control, it is found that in the present, paste-type slaker the attainment of the described, highly efficient slaking operation is dependent on maintaining the desired, thick paste. If the character or physical condition of the lime changes appreciably, or if the proportion of water varies while the lime (as continuously fed) remains exactly uniform, or if other conditions change, there may either be too stiff a mixture to handle properly or too thin a paste for efficient agitation. In accordance with the present invention, as indicated above, control in these respects is readily achieved by sensing the consistency or viscosity of the mixture in the slaking compartment and regulating the actual water-lime proportions as necessary to keep a constant consistency.

More specifically, the control is advantageously effected by sensing the torque or power required to agitate the mix, e.g. the torque needed to turn the mixing elements at a given, constant rate of speed. If the torque so required is higher than that corresponding to the desired consistency of stiff paste, the supply of water is increased, whereas if the required torque falls (indicating a thinner mixture than desired) the water flow is reduced. In the improved apparatus, means for adjusting the input of water to the slaking compartment are arranged for automatic control by means sensitive to the torque or power requirements of the mixing elements, a special feature being that this control or linkage may be of a simple, mechanical type.

In this way the ratio of ingredients is maintained or adjusted as necessary to provide the desired mixing and slaking characteristics, and variations in slaking requirements (and thus in the consistency of the mix) caused by other factors such as change in the calcium oxide content of the lime or change in water temperature, are automatically compensated, e.g. by adjustment of water supply to maintain constant viscosity in the slaker. Furthermore the same means provides automatic change in the water feed to correspond with change (as desired from time to time) in the rate of lime feed.

Thus by mixing the lime and water to a thick paste consistency while controlling the ingredient ratio in accordance with consistency and in a manner to achieve uniform consistency or resistance to mixing, an unusually reliable and efficient operation results. As explained, the apparatus may be relatively small in size for its production capacity. Ordinarily, no insulation is required, yet a relatively high temperature can be reached in the lime and water mixture, with corresponding advantage. Furthermore, this sensitive control by consistency or torque requirements is made feasible by operating in the paste range of viscosity; the presently preferred ratio of water to lime (by weight) is approximately 2:1, a more generic range of ratios to which the invention is applicable being between one and three (e.g. less than three) parts of water for each part of lime by weight. With considerably more dilute mixtures, there is a far less close relation of power requirement to change in consistency or viscosity. Finally, a particular advantage of the improved slaker is its ability to handle a wide range of lime feeds, with equal efficiency and completeness of slaking in all cases. The apparatus is automatically responsive to change in the rate of lime supply, e.g. in that the correspondingly immediate change in consistency effectuates whatever adjustment of water supply is required for the new rate of lime feed.

As will be shown in connection with a particular embodiment of the invention described below, the apparatus, as utilized for slaking lime, includes a slaking compartment and means for supplying lime and water thereto. Cyclically moved, e.g. rotated, mixing and advancing means are provided in the compartment, with means for sensing the load on the mixing device, i.e. the amount of torque required to turn it. Such means determines, in effect, the average consistency or viscosity throughout the entire mass traversing the vessel. Means are also provided for controlling the supply of one of the ingredients, viz. the water, in accordance with the changes in torque, so that the mixture is maintained at the desired consistency of a thick paste, which can be readily determined by observation. Since conventional requirements are for the ultimate delivery of the slaked lime in the form of a very dilute suspension (that may be in part a solution but is here conveniently termed a suspension), the apparatus includes a dilution chamber to which the fully slaked paste is continuously advanced and in which further water is added. In the described embodiment, improved provision is made for separating foreign matter from the product after the slaking operation and after or in the course of the addition of further water.

For a more complete description of one form in which the invention may be carried out, reference is made to the drawings wherein:

Fig. 1 is a side elevation, with parts in section, of a lime slaking apparatus embodying the invention;

Fig. 2 is a top plan view of the apparatus, partly in section, taken along the line 2—2 in Fig. 1;

Fig. 3 is a cross-sectional view taken along the line 3—3 in Fig. 1;

Fig. 4 is an end elevation as viewed from the left in Fig. 1;

Fig. 5 is a detailed view (in section on line 5—5 of Fig. 2) of the drive and torque controlled mechanism; and Fig. 6 is a detailed top sectional view, taken along the line 6—6 in Fig. 5 of the valve for the water feed.

The apparatus shown in the drawings includes a slaking compartment 10, a dilution compartment 11, and a drive and control device 12, all suitably supported as shown.

The slaking compartment 10 may be formed as an elongated trough or tank with a generally rounded bottom 13, and sides 14. It may be closed at the ends by end walls 15 and 16 and the top may be closed by a cover 17.

A lime supply port 24 is defined in the cover 17 at the left-hand end of the slaking compartment 10, as viewed in Fig. 1, to permit the feeding of unslaked lime into the compartment at that locality; and a water supply port 26 is located in the same end of the compartment to supply water at that locality.

Parallel shafts 18a and 18b may be rotatably mounted in the compartment 10 extending the length thereof. The shafts 18a and 18b pass through the end walls 15 and 16 and are rotatably journalled in suitable bearings 20 and 21. Sealing means 22, 23 may be provided at the end walls 15 and 16 where the shafts extend therethrough.

Paddles 25 may be mounted at spaced positions along the shafts 18a and 18b. The paddles as shown extend outward radially from the shafts and are wider at the outer ends than at the ends connected to the shafts. Also, as shown, the outer ends of the paddles 25 are flat. However, it will be appreciated that other forms and shapes and mounting may be used for the paddles to achieve the purpose of mixing the unslaked lime and water supplied to the compartment 10 through the ports 24 and 26.

The paddles 25 on the two shafts interleave with each other, as shown in Fig. 2, but they do not touch. The shafts may be arranged to turn in opposed directions, as shown in Fig. 3, to obtain a thorough blending and mixing action. The paddles 25 may have a rake or angle $a$, as indicated in Fig. 1, so as to advance the water and lime mixture from the left-hand end of the compartment 10, as viewed in Fig. 1 toward the right-hand end.

The shafts 18a and 18b are driven from gear box 30 through suitable couplings 31a and 31b. Power input to the gear box 30 is from motor 32 through belt 33 and pulley 34. Pulley 34 may be connected in driving engagement with crank 36 and shaft 37 (on which the crank is mounted), the connection being made through suitable means such as shear pin 38. Worm 40 is keyed to shaft 37 for rotation therewith. The worm 40 is in intermeshing driving engagement with worm gear 41a and the latter is keyed to shaft 42a. The shaft 42a is in driving engagement with coupling 31a and the latter engages shaft 18a, as noted above.

The shaft 41a also carries a spur gear 43a in mesh with an identical mating spur gear 43b which is keyed to a shaft 42b that in turn is arranged to drive the shaft 18b through coupling 31b.

Thus, in operation the motor 32 drives the paddle shafts 18a and 18b through belt 33, pulley 34, shaft 37, worm 40, worm gear 41a, shaft 42a, spur gears 43a and 43b, shaft 42b, and couplings 31a and 31b. As the shafts 18a and 18b turn at a constant speed in the slaking compartment (e.g. in the direction indicated), the amount of torque on the shafts varies with the viscosity of the mixture in the compartment. The sum of the torques on shafts 18a and 18b (acting through the worm gear 41a) results in a reaction on the worm 40 which is converted by the worm into a thrust to the left on shaft 37, as viewed in Fig. 5. Shaft 37 is free to rotate and translate axially in bearings 45 and 46. A ball thrust bearing at the left end of shaft 37 transmits the thrust through inner race 47, balls 48 and outer race 49 to a thrust plate 50. A cage 51 and snap ring 52 serve to keep the thrust bearing 44 and thrust plate 50 in alignment. A sealing diaphragm 53 may be clamped between the thrust plate and a thrust fork 55 by screw 56, i.e. to prevent escape of lubricant from the gear box. Thrust fork 55 is connected by pin 57 to lever 58 at a point intermediate the ends of lever 58. Lever 58 is connected at its lower end to an upstanding, fixed fork member 60 by means of a pin 61, and the lever is connected at its upper end to a fork 62 by a pin 63.

Opening 64 formed in the lower end of the lever 58 to receive the pin 61 in a horizontal slot as shown and the lever is normally maintained in its most rightward position, i.e. with the pin 61 in the left-hand end of the slot 64 as shown, by a spring 65 abutting against the lower end of the lever 58 at 66. The spring 65, which is a coil spring under compression, is supported at its left-hand end by an adjustable screw 67 which is threaded in a bracket 68.

A leaf spring 70 is supported at its lower end in a supporting member 71 and extends upward to a position in line with the shaft 37. The leaf spring 70 is connected to the lever 58 by means of adjustable linkage members 72, 73. It will be understood that the torque requirements which urge the shaft 37 to the left are restrained by the leaf spring acting through the adjustable linkage members 72 and 73.

The fork 62 which is connected to the lever 58 through the pin 63 is connected to a valve shaft 75 slidably mounted in the valve body 76. The end of the shaft 75 in the valve body is provided with a suitable valve closure element 77 which may engage valve seat 78 to close the valve, as best shown in Fig. 6.

By this arrangement of parts, a movement to the left of the shaft 37, as shown in Fig. 5, because of increased torque on the shafts 18a and 18b, causes a movement of the upper end of lever 58 to the left against the pressure of the restraining leaf spring 70 and causes the valve element 77 to move further away from the valve seat 78 to permit an increased flow of water through the valve in the direction indicated by the arrows, this movement being transmitted to the valve shaft 75 through the pin 63 and fork 62. When the valve element is moved away from the valve seat in this manner, more water is admitted to the slaking compartment through the port 26; the water thus moves through pipe 80, valve 76 to pipe 81 and out through port 26, see Fig. 1. The effect of admitting more water to the slaking compartment reduces the torque requirements for turning the paddles 25 and with the reduced torque on the shafts 18a and 18b, the thrust of the worm to the left will be decreased in that the leaf spring 70 will return the shaft 37 to the right, thereby causing the upper end of the lever 58 to move slightly to the right, such movement causing the valve element 77 to move toward the valve seat 78, thereby reducing the flow of water through the valve to the slaking compartment. Thus, an increased water supply will tend to decrease the torque requirements and the system will seek an equilibrium point determined by the rightward force exerted by the leaf spring 70 against the thrust to the left of the shaft 37. As will be apparent, a decrease in the torque requirement of the paddle shafts will produce a displacement of the valve element 77 toward the closed position, reducing the water supply and stiffening the mix, with consequent further adjustment of the valve element to a position of equilibrium for the system.

The force exerted by the spring 70 on the shaft 37 may be adjusted to provide the desired consistency of paste in the slaking compartment by the axial adjustment of the linkage members 72, 73. The linkage members 72 and 73 may also be adjusted, if necessary, when different operating conditions are encountered, for example, where greatly different kinds of lime are used for the feed material.

It will be noted that although the control may by necessity and indeed without detriment involve some hunting in the adjustment of the valve element 77, the preferred form of the system is basically such that the spring 70 modulates, i.e. provides a continuously modulated response. Thus, the valve is brought to rest at an appropriate intermediate position in accordance with the needs of the lime feed, and tends to remain at or near such position, with correspondingly constant water flow to the slaking compartment except as changes in the feed of lime require change in the supply of water. Useful operation, however, may in some cases be obtained with an on-off type of control, as by use of a spring 70, having a rate such that if the torque thrust is above a certain value the valve opens all the way and if below that value, the valve closes.

An adjustable stop screw 82 is threaded in bracket 83 so that the end 86 thereof may abut against the upper left hand side of the lever 58, as viewed in Fig. 5, when the valve 76 is fully opened by the thrust on shaft 37. If the thrust becomes too great and exceeds a value determined by the rate and the adjustment of spring 65, the force of the spring 65 will be overcome and the lower end of the lever 58 will move to the left within the limits of slot 64. A sensitive switch 87 is provided as shown in abutment with the left-hand side of the lever 58 adjacent its lower end. The switch may be connected so as to turn off both the motor 32 and the lime feeding means (not shown) if such means is automatically operated. Switch 87 is actuated by the described movement to the left of the lower end of the lever 58. The force of the spring 65 may be adjusted by turning the screw 67. The stop screw 82 is adjustable in the bracket 83 to determine the maximum valve opening. An important function of the stop screw 82 and the relief means including the spring 65 and the switch 87 is to shut down the drive and thus prevent damage to the apparatus, in the event that a rock or other impediment stops or suddenly slows down the paddles 25.

As noted above, the paddle blades 25 have an angle or pitch $a$ such that the lime paste formed by the lime and water in the slaking compartment is moved from left to right as viewed in Fig. 1. The paste and foreign particles entrained in the paste are forced over the end or baffle 16 of the compartment 10 at three notches or low spots 90. At each notch, there is an inclined plate 91 against which a fan-shaped spray of water is directed from nozzles 92. The water from the nozzles impinges upon the lime paste as it moves down the incline plates 91, causing the paste to break as it washes down into the dilution compartment 11. Although other means, such as an opening or door through the cover, may be employed for observing the condition of the lime and water mixture as it moves down the inclined plates 91, it appears that in many cases the effectiveness of control obviates need for frequent visual inspection. The dilution compartment 11 comprises a chamber for receiving diluted lime paste and is provided with a trough or sump area 93. The dilution compartment serves two purposes. The first purpose is to dilute the hydrated lime paste to a watery slurry which can be conveniently transported through pipes to the point of application. The second purpose for the dilution compartment is to separate the rocks and other foreign material which had been entrained in the lime paste. As the lime paste is broken up upon entering the dilution compartment, the foreign material drops into the trough or sump area 93. Additional water enters the dilution compartment through nozzle 95 and nozzles 96. The precise amount of water which enters the diluting compartment is not critical and it may be adjusted manually by valves (not shown) for the nozzles 92, 95 and 96. Users of apparatus and procedure for slaking lime are concerned primarily with the output of slaked lime itself; the proportion of dilution water that accompanies it can usually have rather large variations, without detriment.

The jet of water from the nozzle 95 is directed at the open end of pipe 97 which is disposed above the level of liquid in the dilution compartment, as best shown in Figs. 1, 2 and 4. The jet from nozzle 95 is arranged to act as an ejector to draw into the open end of the pipe 97, the mixture of lime dust, steam and hot air which constitutes the atmosphere inside the slaker. The water and condensed steam, together with the lime dust suspended therein, drains down pipe 98 back into the dilution compartment. The gases which remain in the ejector system pass out through vent 100 to a harmless point for disposal. Although the ejector device 95, 97 could be placed in the top of the slaking compartment 10 (especially if there is further partitioning above the wall 16), its location in the dilution chamber has been found particularly satisfactory.

The liquid level in the dilution compartment 11 is maintained at a point 101 by means of a weir 102. The lime slurry passes out of the dilution compartment through the opening 103 and thence over the baffle or weir 102 into chamber 105. The slurry may be conducted from chamber 105 to the point of application by pipe 106. A port 107 may be provided in the side of chamber 105 to serve as an emergency overflow. Baffle 108 which extends below the level 101 of the lime slurry defines the opening 103 through which the slurry moves in leaving the dilution compartment 11. The baffle 108 serves to prevent escape of the gases, steam and dust from the dilution compartment except through the exhaust pipe 97, as described.

The mixing and kneading action in the slaking compartment has effectively broken up the lime lumps so that the lime content of the paste is smooth; the jets of water from the nozzles 92 distribute the lime paste as it comes over the end wall or baffle 16 and down the inclined plates 91, and tend to wash the lime particles away from any hard lumps, pebbles or grit (i.e. impurities), so that the desired slurry of slaked lime is formed in the dilution water, suitable to be carried upward through the opening 103 and over the weir 102.

Rocks and other foreign particles too large or too heavy to be thus carried in the lime slurry settle out to the bottom of the dilution chamber in the trough 93. This foreign matter may be removed from the trough either periodically or continuously by appropriate means, such as rubber scraper blades 110, which can be automatically or manually operated. One arrangement suitable for the purpose is shown in Figs. 1 to 3 and includes a lower sprocket 111 (in the trough 93) and an upper sprocket 112 (above the compartment 11) and an endless chain or belt 113 which is carried by the sprockets and to which the scraper blades 110 may be attached. The sprocket 112 may be driven by a suitable means such as a motor 115 and gear reducer 116 operating through the belt 117 and pulleys 118 and 119. The foreign matter which collects in the trough 93 is pulled up inclined trough 121 until it reaches the point 122 where it may fall down into a convenient receptacle (not shown) through a chute 123. The pair of nozzles 96 may be used to direct jets of water down the inclined trough 121 and against the upward moving scraping blades. These streams or jets of water serve to wash small particles of lime which might otherwise be carried away with the grit and other foreign material being drawn from the dilution compartment. It will be understood that if desired the stones and other foreign material may be removed from the trough 93 by any other suitable means, even such as a manually operated rake or scraper.

Although it may be desirable to provide mechanical agitation means in the dilution compartment such as a propeller agitator or the like, it appears that the circulation otherwise occurring is in many cases sufficient to keep the relatively finer lime particles in suspension and to prevent their being carried away with the foreign material as it moves up the inclined trough 121.

It has been found that in the slaking of lime in apparatus of this invention in which the lime is slaked by mixing with water to form a heavy paste, no heating of the water is necessary prior to its introduction into the slaking compartment 10, and no insulation or other means are necessary to maintain the temperature of the mixture in the slaking compartment because the heat generated by the reaction is sufficient to assist in the complete hydration of the lime. The slaking of the lime in a paste form also results in better mechanical efficiency in breaking up the pieces of lime, e.g. provides much more effective use of the paddles than in situations of greater aqueous dilution. The torque or reaction on the paddles, moreover, accurately represents the physical condition of the lime-water mixture, especially in that the condition is sensed throughout the slaking compartment rather than just at one specific locality.

The operating ratio contemplated is preferably about two to one by weight, viz. two pounds of water to one pound of quicklime (CaO). A mixture of this order of proportion, which is substantially less than 3:1 and greater than 1:1 makes a paste which fully achieves these results and which attains a high temperature as a result of the exothermic reaction. The temperature ordinarily rises to about 212° F., and contrary to the theory of previous slakers involving control by temperature (where it has been sought to keep the operation between 160° and 190° F.), it has been found unnecessary to control the temperature in any way. Indeed, the high temperature appears to assist the slaking materially, and any local boiling or release of steam facilitates the disintegration of solid masses. Thus, in the present invention, the slaking operation is run very hot and complete breaking up and slaking of the lime is achieved by controlling the viscosity of the lime and water mixture, i.e. by regulating the rate of water flow in relation to the lime feed, to maintain a constant paste consistency.

The apparatus of this invention is much smaller than any apparatus heretofore deemed practical, primarily because it effectively provides operation at a paste consistency of the lime-water mix and affords attainment of a high slaking temperature (regardless of the temperature of the water or of the ambient temperature or of the character of the supplied lime), so that a much shorter retention time, i.e. about 5 minutes, is required to achieve complete slaking. Even very cold water (down to 32° F.) may be used, and the mixture will still rise in temperature, e.g. to maintain a value at or close to 212° F. Furthermore, the size of the slaking compartment is further reduced because the paste requires less water, i.e. as distinguished from prior devices in which the lime was slaked with greater quantities of water. The present equipment, moreover, does not require heat exchangers or preheaters for the water entering the slaker, nor is it necessary to insulate the mixing chamber.

With the viscosity control of this invention which automatically adjusts the input of water, the output of slaked lime from the apparatus may be controlled by the rate of quicklime feed. It has been found that the torque-responsive control operates over a wide range without requiring adjustment of the balancing spring 70. For example, in an apparatus in which the length of the slaking compartment 10 from the end 15 to the end or baffle 16 measures three feet, and in which the width between the sides 14 is one and three-quarters feet, and in which the height of the compartment from the bottom 13 to the cover 17 is one and one-half feet, slaking may be carried out effectively at rates of lime feed from 25 lbs. to 1300 lbs. per hour. In this equipment, the motor 32 has a maximum capacity of ½ horsepower, and drives each of the paddle shafts at approximately 40 r.p.m.

As previously noted, the lime is fed to the slaking compartment through the port 24. It is desirable to employ a feed which permits a free fall into the slaking compartment because otherwise in the steaming atmosphere of the compartment the lime would tend to build up on parts and become an incrustation of mortar. It is contemplated that any suitable type of feeding device may be employed such as a scale-type belt feeder, other kinds of feeders measuring material by weight, a screw feeder, or the like. Feeding can be accomplished in any way, even by hand shoveling, that delivers the lime into the port 24.

In the apparatus of this invention the slaking or hydration of the lime is complete by the time the thick mass, which is comparable to a heavy batter, reaches the end 16 at which point the mass is passed through the notches 90.

Although other means, such as electrically operated means responsive to the electrical power consumed by the motor, may be employed for controlling the supply of one or more ingredients (e.g. the water valve) in accordance with consistency or viscosity of the material being mixed, and although other directly torque-responsive systems can be used, it has been found that in the controlling of the consistency of the lime and water mixture in the lime slaker, the mechanical arrangement shown is particularly effective in keeping the consistency within the limits desired and that the apparatus has the advantage that it is easy to maintain and can withstand rough usage and continue to operate satisfactorily.

The torque (as sensed for control of the valve) is representative of the conditions throughout the length of the slaking compartment, and the changing or correcting of the viscosity is in accordance with changes in the sum of the torque requirements as indicated by the resistance met in turning the paddles 25 carried on the shafts 18a and 18b.

It will be understood that for simple, direct control of the water valve in the manner of the apparatus shown, the driving means should preferably be operated at a constant or substantially constant speed. Thus, the motor 32 is advantageously an induction-type motor having practically constant speed over a wide range of operating power; changes in torque are thus quite accurately representative of changes in viscosity of the material being mixed. The control is such as to respond to changes in load on the paddles and to vary the ingredient feed (i.e. the water) for restoring the load to its desired value. Under approximately constant rate of drive, changes in torque are also, of course, representative of changes of power and vice versa, so that unless otherwise stated, either term herein can be taken to embrace the other, and both are comprehended by references to load, i.e. in that in all cases the factor sensed and utilized for control is the load on the mixing means.

In starting the slaking cycle in the equipment shown, the slaking compartment 10 is filled with water and the heavy paste is gradually built up by feeding lime through port 24. As the viscosity of the paste increases and the torque requirements result in a thrust of the shaft 37, the water starts to feed through port 26 as required.

A bypass water line 125 with a manual valve 126, as shown in Fig. 1, may be provided around torque-controlled valve 76 so that the slaking compartment 10 may be filled with water to start the slaking operation and also to provide water in the compartment for cleaning out the equipment when it is to be shut down. The line 80 also may be provided with a main valve (not shown) to close the water line 80.

The adjustment of the apparatus to obtain continuous production of a satisfactory product, with full achievement of the objects of the process, is relatively simple. The optimum requirements for the paste as it reaches the baffles at the end of the slaking compartment are: that it be essentially smooth (except for lumps of impurities), i.e. with the lime fully broken up and homogeneously mixed with water; that the lime be approximately 100% slaked, with no unslaked lumps; and in general, that it be about as stiff or viscous as appears practical to mix (in the given apparatus) while obtaining the above characteristics of smoothness and full slaking. Attainment of these characteristics, at the outset of operation, can be readily judged by observation, with simple tests if necessary, and any needed adjustments can be readily made (as of the device 72) to bring the paste to the desired condition; thereafter, the control of the water valve by the torque-responsive means will keep the product in such condition, regardless of variations in lime feed or other factors, or of loss of water as steam. As indicated, the resulting paste has a water-lime ratio within the range given above, and usually in the vicinity of two to one (by weight), although the precise value may vary, even during a given run as will now be understood.

For a given torque requirement of the mixing elements (representing viscosity averaged along the mixer shafts), there will usually be a lower proportion of water at high rates of lime feed than at low rates, possible because at high rates of operation there is a larger quantity of relatively dry lime in the entering region of the mixing compartment. Hence it is somewhat preferable to adjust the apparatus for optimum paste results at a high feed rate. Although care should be taken to avoid a paste so thin at low feed as to lose mixing efficiency, the process and apparatus have some latitude as to the actual paste produced; a paste somewhat less stiff can be tolerated at low feed rates, apparently because there is a longer average retention time per particle at such rates. In all cases, of course, the paste should be heavy enough to preserve mixing efficiency and also to carry grit and impurity lumps over the baffle 16.

It will be appreciated that, while the invention has been described with relation to controlling the viscosity of the paste by control of the water feed, an effective control could also be accomplished by regulating the rate of feed of the lime. However, it is usually desired to have independent control of the quantity of slaked lime produced so that it may be kept constant or varied in accordance with requirements of use. Hence, it is in most cases specially desirable to adjust only the water feed in accordance with load on the mixing means; the supply of unslaked lime can be varied in rate or kept constant to afford corresponding changes or constancy of slaked lime production as needs dictate. Factors such as the physical properties of the lime, and its impurities, and the temperature of water supply, do not then materially affect the rate of slaked lime output.

The invention as applied in the preferred form shown in the drawings allows particularly direct and simple control of the output and of conditions during the slaking process. As noted above, it is only necessary to control the input of unslaked lime. Furthermore, the operating conditions of proper consistency and adequate temperature are automatically controlled.

In the description of the invention, particular attention has been given to its special purpose and advantages in the slaking of lime. However, it should be understood that the apparatus and procedure are applicable to the mixing of other liquid and solid ingredients in which it is desirable or necessary to obtain a mixture of substantially constant viscosity. For example, the described improvements are applicable to the mixing of various dough-like or paste-like materials, where at the present time control of consistency is sought by accurate proportioning of ingredients. Such controls are demanding of time and effort and require special weighing and measuring equipment which can be substantially eliminated by a simple viscosity-torque or similar control such as here disclosed.

It should also be noted that whereas in describing the ingredients to be mixed reference has been made to mixing a solid with a liquid, the present means and methods are also applicable to the mixture of two liquids or to solid-liquid mixtures involving more than one liquid or more than one solid. It may be found desirable when some of these ingredients are mixed to control the feed of more than one of them or to control some other quantity such as heat applied to the mixing compartment in response to the torque or load requirements.

Reviewing briefly the description of the invention, it will be appreciated that the invention and the method and apparatus described fulfill the specific objects set forth of providing a more efficient means of slaking lime which is operable over a wide range of quality and quantity, and more generally, are adaptable for control of the consistency of liquids and solids which are being mixed.

In accordance with the provisions of the patent statutes, I have herein described the principle of operation of the invention, together with the elements which I now consider the best embodiments thereof, but I desire to have it understood that the structure disclosed is only illustrative and the invention can be carried out by other means. Also, while it is designed to use the various features and elements in the combinations and relations described, some of these may be altered and modified without interfering with the more general results outlined.

Having thus described my invention, I claim:

1. In a process for continuously slaking lime by mixing lime and water from continuing supplies thereof in amounts approximately proportioned to yield a paste product including the steps of feeding lime and water substantially continuously as ingredients to one locality in a slaking region, continuously mixing said lime and water in said region to slake the lime and to yield a paste of slaked lime while continuously advancing the mixture to a delivery locality, and continuously delivering slaked lime paste at said delivery locality, the improvement comprising continuously maintaining the consistency of said lime paste at a predetermined constant value conducive to optimum slaking efficiency despite variations in the lime feed by detecting changes in the consistency of the lime and water mass in the slaking region throughout the path of travel of the mixture between the first locality and the delivery locality, and adjusting the feed of water in response to the detected changes, said adjustment of the water feed comprising reducing the water feed upon decrease of the detected consistency of the mass below the predetermined consistency and increasing said water feed upon increase of the detected consistency of the mass above the predetermined consistency, for restoring the mass in the slaking region to, and thereby substantially keeping said mass at, said predetermined consistency.

2. Apparatus for slaking lime and separating the slaked lime from impurities, comprising a slaking compartment and a diluting compartment, means for feeding unslaked lime with impurities into one locality of the slaking compartment remote from the diluting compartment, means for feeding water into the slaking compartment adjacent said first locality to form a thick batter of lime, water and impurities, rotatable means for mixing the batter for hydrating the lime, and for advancing the mixed batter to a second locality, adjacent the diluting compartment, means at the second locality for delivering the batter to the diluting compartment, additional water feeding means in the diluting compartment for diluting the batter, an overflow delivery means in the diluting compartment for delivering diluted hydrated lime and water from the diluting compartment, a trough in the diluting compartment for receiving the impurities dropped from the diluted lime and water, means for measuring the torque required to turn the mixing means, and means for controlling the delivery of at least one of the feeding means in accordance with changes in the torque.

3. The apparatus of claim 2 with means for removing the impurities from the trough.

4. Apparatus for slaking lime by mixing successive amounts of lime and water to a predetermined, paste-like consistency, comprising a mixing compartment, means for feeding successive amounts of lime and water as ingredients to one locality of said compartment, a plurality of rotatable intermeshing mixing means in said compartment for mixing said ingredients and for advancing them from said locality to a second locality in said compartment, outlet means at the second locality for delivery of the mixed ingredients as a paste of slaked lime from the compartment, means for applying torque to rotate the mixing means, including a worm gear and a worm coacting therewith, means mounting the worm for axial displacement in accordance with changes in the transmitted torque, means mechanically controlled by the worm in response to axial displacement thereof for controlling the feeding means to adjust the feed of water in response to said changes in torque and in a direction to restore said torque to a desired value, to maintain a predetermined thick consistency of the mass in the compartment, for effecting automatic control of the lime slaking operation to deliver a slaked lime paste of substantially constant consistency and varying in quantity with variations of feed of the lime.

5. Apparatus for slaking lime by mixing successive amounts of lime and water to a predetermined, paste-like consistency, comprising a mixing compartment, means for feeding successive amounts of lime and water as ingredients to one locality of said compartment, mixing and advancing means including rotatable mixing structure in said compartment and driving means for applying torque to rotate said structure, for mixing said ingredients and for advancing them from said locality to a second locality in said compartment, outlet means at the second locality for delivery of the mixed ingredients as a paste of slaked lime from the compartment, torque-responsive means comprising an element mechanically associated with said mixing means and receiving reaction force from the torque applied by said driving means to said rotatable structure, means mounting said element for displacement in response to change in said reaction force due to change in the torque, and means applying opposing force to said element to arrest the element in changed location upon change in said torque, and means mechanically connected with said torque-responsive means and with said feeding means, and controlled by displacement of said element, for adjusting the feeding means to change the feed of water in response to change in torque and in a direction to restore said torque to a desired value, to maintain a predetermined thick consistency of the mass in the compartment, for effecting automatic control of the lime slaking operation to deliver a slaked lime paste of substantially constant consistency and varying in quantity with variations of feed of the lime.

References Cited in the file of this patent

UNITED STATES PATENTS

| | | |
|---|---|---|
| 1,334,395 | Patterson | Mar. 30, 1920 |
| 1,580,710 | Chubbuck | Apr. 13, 1926 |
| 1,613,663 | Leopold | Jan. 11, 1927 |
| 1,634,424 | Hunter | July 5, 1927 |
| 1,825,155 | Meyers | Sept. 29, 1931 |
| 2,171,312 | Meyers | Aug. 29, 1939 |
| 2,218,320 | Wenger | Oct. 15, 1940 |
| 2,452,142 | Pecker | Oct. 26, 1948 |
| 2,560,016 | Walker | July 10, 1951 |
| 2,626,786 | McGlothlin | Jan. 27, 1953 |
| 2,773,507 | Norris | Dec. 11, 1956 |

FOREIGN PATENTS

| | | |
|---|---|---|
| 533,524 | Germany | Sept. 15, 1931 |
| 465,184 | Canada | May 16, 1950 |